Feb. 5, 1963   B. F. WILEY   3,076,334
FLOW METER AND PROCESS FOR WELL BORES
Filed June 24, 1959   2 Sheets-Sheet 1

INVENTOR.
B. F. WILEY
BY Hudson & Young
ATTORNEYS

Feb. 5, 1963
B. F. WILEY
3,076,334
FLOW METER AND PROCESS FOR WELL BORES
Filed June 24, 1959
2 Sheets-Sheet 2
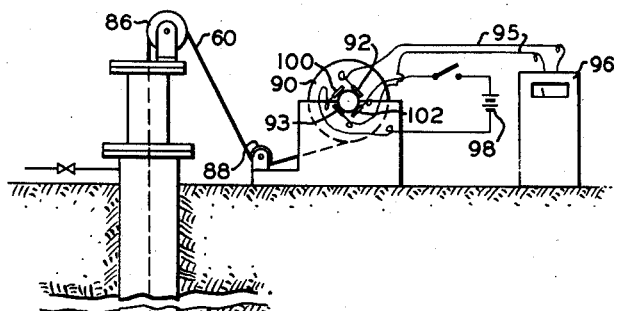
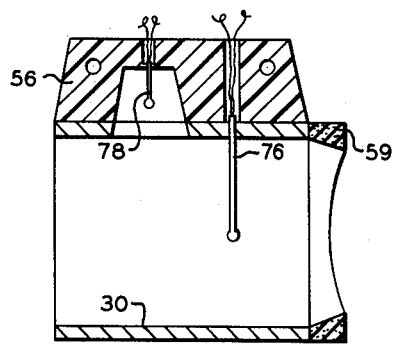
FIG. 7
FIG. 4
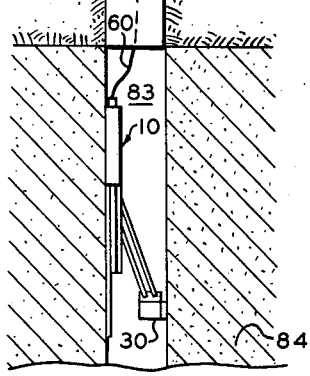
FIG. 6
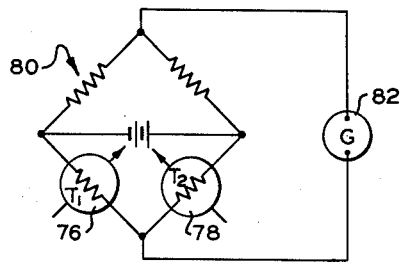
FIG. 5
INVENTOR.
B.F. WILEY
BY *Hudson & Young*
ATTORNEYS United States Patent Office
3,076,334
Patented Feb. 5, 1963

3,076,334
FLOW METER AND PROCESS FOR WELL BORES
Bruce F. Wiley, Bartlesville, Okla., assignor to Phillips Petroleum Company, a corporation of Delaware
Filed June 24, 1959, Ser. No. 822,671
14 Claims. (Cl. 73—155)

This invention relates to a flow meter for use in measuring the radial velocity component of a gas or liquid as it leaves or enters the sand face or wall of a well. Another aspect of the invention relates to a process for determining and plotting the radial flow of fluids thru a sand face within a well.

Various production techniques require a knowledge of permeability of the stratum being produced. When producing a carbonaceous stratum by in situ combustion it is desirable to know the relative flow rates of injected air at different levels in the stratum. This knowledge can be utilized in applying different injection pressure to the stratum at different levels according to the permeability thereof. This is also the case when pressurizing a stratum with any gas or liquid in the process of flushing out hydrocarbons from the stratum.

An object of the invention is to provide a flow meter for measuring the radial flow rate or velocity of fluid thru a restricted area of the sand face of the well. A further object of the invention is to provide a flow meter capable of being positioned in contact with the wall of a well for measuring the radial flow thru a small selected area of the well. Another object is to provide a process for determining and plotting the permeability of a permeable stratum around a well. Other objects of the invention will become apparent upon consideration of the accompanying disclosure.

A broad aspect of the flow meter of the invention comprises a hollow probe body adapted to be lowered into a well with its axis longitudinal to the well, an anemometer within a housing having an axial passageway for fluid, the axis of which is perpendicular to the axis of the probe body, the anemometer being attached to the probe body by an oscillatable support member which moves the anemometer into and out of contact with the wall of a well after positioning the probe body at the selected level while maintaining the axis of same perpendicular to the well axis, and means within the probe body for oscillating the anemometer into and out of contact with the well wall. Indicating means at ground level is connected with the anemometer for indicating the fluid velocity thru the anemometer or housing surrounding same.

Figure 1:
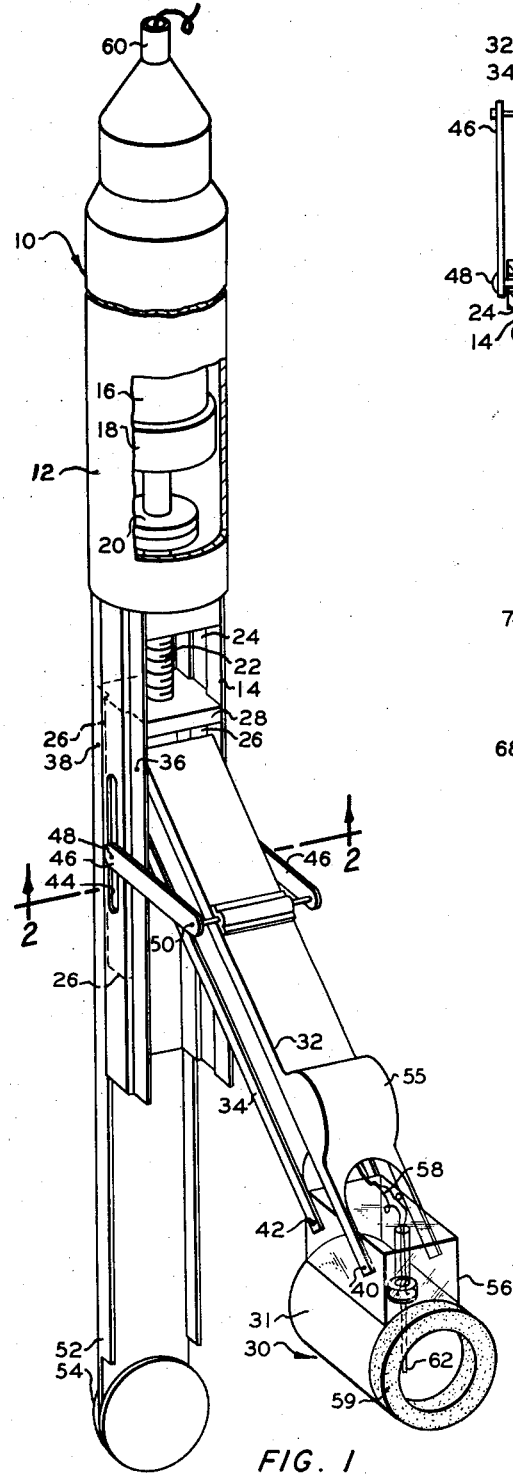
Figure 2:
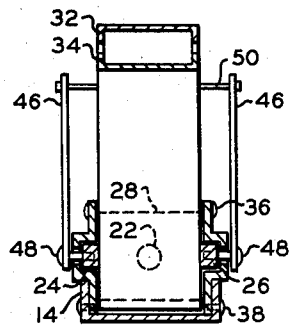
Figure 3:
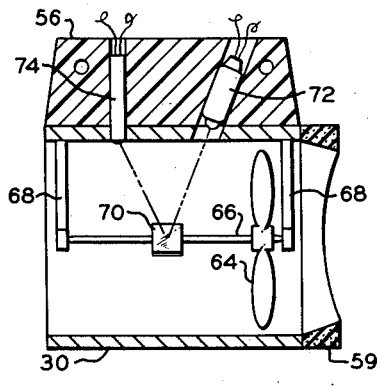

A more complete understanding of the invention may be had by reference to the accompanying schematic drawing of which FIGURE 1 comprises a pictorial view of one embodiment of the flow meter of the invention; FIGURE 2 is a cross section on the line 2—2 of FIGURE 1; FIGURE 3 is a longitudinal partial cross section of one embodiment of the anemometer; FIGURE 4 is a similar view to FIGURE 3, showing another embodiment of the anemometer; FIGURE 5 is a circuit diagram of thermistors in a bridge circuit suitable for use in the anemometer of FIGURE 4; FIGURE 6 is an elevation thru a carbonaceous stratum showing an arrangement of apparatus for utilizing the invention and FIGURE 7 is a plan view of a conventional 5-spot well pattern.

Referring to FIGURES 1 and 2, a probe body 10 comprises an upper cylindrical section 12 and a lower square section 14. Section 12 comprises an outer brass casing enclosing a reversible motor 16, a reduction gear 18, and a slip clutch 20. Slip clutch and reduction gear 18 are on a shaft connecting motor 16 with screw 22 which extends into square section 14. A pair of opposite inner walls of section 14 (made of aluminum) is provided with longitudinal grooves 24 which serve as guides for a pair of opposed elongated metal arms 26 attached at their upper ends to a threaded crosshead 28 thru which screw 22 is threaded so that upon rotation of the screw crosshead 28 and arms 26 are moved along grooves 24.

An anemometer 30 comprises a housing 31 supported with its axis perpendicular to the axis of the probe body by means of a parallelogram comprising outer support arm 32 and inner support arm 34 which are pivoted in section 14 on opposed pins 36 and 38 respectively. Opposite ends of the support arms are pivoted on the anemometer at 40 and 42. Support arms 32 and 34 are of U-shaped transverse cross section made of aluminum. Slots 44 in opposite sides of section 14 passing thru grooves 24 provide from attachment of a pair of actuating arms 46 to arms 26 by means of pins 48. The opposite ends of actuating arms 46 are connected to outer support arm 32 by means of pin 50 which is fastened intermediate its ends directly to arm 32, as by welding or clamping or other suitable means.

As reversible motor 16 operates, its rotation is translated to rotation of screw 22 which moves crosshead 28 and arms 26 along grooves 24, thereby moving pins 48 longitudinally of the probe body along slots 44 so as to actuate arms 46 which serve as a pitman between arms 26 and the parallelogram's support means. Movement of the pitman upon rotation and reversal of motor 16 effects oscillation of anemometer 30 from a position adjacent the probe body axis to a position in contact with the well wall and back again. Slip clutch 20 acts as a safety device when anemometer 30 contacts the well wall and also when it is thrown back to the axial position.

Metal anemometer housing 31 is provided with a resilient ring 59 around its contacting edge opposite the well wall or remote from the axis of the probe body. A bumper arm 52 extends longitudinally from the lower end of section 14 of the probe to a position opposite anemometer 30 and is adapted to receive the anemometer housing when it is oscillated into axial alignment with the probe. A hard rubber bumper 54 on the lower end of the bumper arm extends radially outwardly opposite the anemometer and is adapted to contact the wall of the well in lowering and raising the probe and also when seating the anemometer against the wall of the well. A Lucite or Plexiglas bumper 55 on arm 32 also protects the anemometer when moving the flow meter up or down in the well.

Numeral 56 designates a Lucite or Plexiglas case or housing for a sensing means connected with the anemometer from which wires 58 lead to the well head. A cable 60 is a metal sheath type cable, housing leads 58 and also the motor leads, not shown, as well as serving as the support cable for the device.

In the anemometer shown in FIGURE 1, leads 58 connect with a thermistor 62 which extends into the axial passageway of housing 30. This thermistor is in a constant current circuit so that fluid flow thru the anemometer housing across the thermistor is a function of voltage drop across this device.

In FIGURE 3, a sensitive fan 64 is fixed on a rotatable shaft 66 axially supported in the housing between needle bearings in posts 68. A mirror 70 is fixed to shaft 66 so that as the shaft turns, light from a light source 72 is reflected once each revolution of the shaft to a photodiode 74 which sends out a signal once each revolution of the fan or shaft so that the frequency is a function of the fluid flow thru the anemometer.

The anemometer of FIGURE 4 utilizes a flow sensing thermistor 76 extending into the fluid passageway thru the anemometer and, also, a reference thermistor 78 housed within casing 56 and out of the line of flow. Thermistor 78 may be sealed off entirely from the passageway thru the anemometer. The circuitry for thermistors 76 and 78 in a bridge circuit 80 connected with a galvanometer 82 is shown in FIGURE 5.

FIGURE 6 shows flow meter 10 suspended in a well 83 opposite a permeable carbonaceous stratum 84 by means of cable 60. Cable 60 is threaded thru pulleys 86 and 88 and is attached to windlass 90, which is used in lowering and raising the flow meter in the well. Cable 60 is a strong commercially available metal sheathed cable for this purpose and includes 4 electrical leads or wires which are connected to brushes on the shaft of the windlass. Brushes 92 and 93 pick up the signals from the anemometer and transmit the same via wires 95 to indicating instrument 96 which is designed to convert the signals received into any suitable value such as fluid flow in inches per second, feet per minute, etc. Power for the anemometer and for the motor is supplied by a battery 98 which is connected with brushes 100 and 102 which in turn are connected with the leads from the anemometer circuitry.

FIGURE 7 shows a ring of wells 105 around a central well 83, a conventional arrangement or pattern of wells used in oil production.

In order to plot the permeability or flow pattern thru the sand 84 at different levels into the well 83, air or other suitable fluid is injected thru a ring of wells 105 surrounding well 83 into stratum 84 so that the injected fluid passes into well 83. Anemometer 30 is positioned successively at different levels against the sand face so as to obtain the relative radial velocities of flow therethru and these values can be plotted in known manner to indicate the change of permeability from level to level. It is also feasible to sense the fluid flow around a circumference of the well at different levels to obtain the relative permeabilities of the stratum around the borehole as well as at different levels.

A device constructed substantially in accordance with that of FIGURES 1 and 3 was made and tested at various air flow rates and was found to be sensitive to very low flow rates of air. The device thus constructed is well adapted to measure the permeability of a permeable stratum around a well and the gas flow rates into same at different levels and at different locations around the circumference of the well.

The flow meter described herein when properly sealed is adapted to sensing liquid flow rates such as in waterflooding processes.

If the assumption is made that the radial distribution of flow in any plane perpendicular to the borehole or parallel to the bedding plane is uniform, a log or plot of the permeability profile can be obtained from point by point observations of radial velocities or by continuous logging. In order to test the validity of the above assumption or correct for non-uniformity the anemometer may be run on tubing and oriented to any desired bearing, it would also be possible to provide a mechanism for orienting the anemometer to any bearing when run on a logging cable, much the same as used in dip logging techniques.

Certain modifications of the invention will become apparent to those skilled in the art and the illustrative details disclosed are not to be construed as imposing unnecessary limitations on the invention.

I claim:

1. A flow meter for measuring the radial velocity of fluid thru the wall of a well into the open well which comprises, in combination, an elongated hollow probe body adapted to be lowered into a well with its axis longitudinally thereof; a cylindrical housing open at both ends and having an anemometer positioned therein so that fluid passes thru said housing into the open well and actuates said anemometer; means in the form of parallelogram supports supporting said housing from said body with its axis perpendicular to the axis of said body and oscillating said housing from a position adjacent the axis of said body into contact with the wall of said well while maintaining said perpendicular relation; and indicating means connected with said anemometer for indicating fluid velocity thru said housing.

2. The flow meter of claim 1 including a motor in said probe body in operative control of said supports and the oscillation of said housing; and means for operating said motor from outside the well.

3. The flow meter of claim 2 including a bumper arm extending longitudinally outside of and attached to said probe body on the side opposite said housing and a radially extending contacting element on said arm for contacting the well wall when said housing is extended to the opposite wall of the well.

4. The flow meter of claim 2 wherein said motor is reversible, and including, a screw extending longitudinally within said body to which said motor is operatively connected; a non-rotatable threaded crosshead on said screw movable along same upon operation of said motor; an arm attached to said crosshead slidably engaging the inside of said body and extending away from said motor; an actuating pitman connecting said arm with the more remote of said parallel supports whereby movement of said crosshead along said screw moves said housing laterally with respect to the axis of said body.

5. The flow meter of claim 1 wherein said anemometer is a thermistor.

6. The flow meter of claim 1 wherein said anemometer is an impeller.

7. A flow meter for measuring the radial velocity of gas thru the wall of a well which comprises an elongated hollow probe body adapted to be lowered into a well with its axis longitudinally thereof; a reversible electric motor within an end section of said body; an elongated screw extending axially of said body toward its opposite end section and operatively connected with said motor; a pair of longitudinal grooves in opposite inner walls of said body parallel with and opposite said screw; a crosshead threaded on said screw; a pair of elongated arms attached to said crosshead and seated in said grooves, said arms extending away from said motor; a longitudinal opening in a side of said body parallel with a plane connecting said grooves and extending from a point opposite an intermediate section of said arms thru the end of said body remote from said motor; a pair of parallel supports of equal length carried at one end by opposed pivots, one in the wall containing said opening and the other in the opposite wall; an annular housing pivotally attached to the opposite ends of said supports so that its axis is perpendicular to the axis of said body; an anemometer within said housing adapted to sense axial flow of gas therethru; a pair of longitudinal slots in the walls of said body along said grooves; a pair of pitmans pivotally connected at one end thru said slots to said arms and pivotally attached at the opposite end to the more remote of said supports so that longitudinal oscillation of said arms in said grooves oscillates said housing away from and toward the axis of said body into and out of contact with a well wall; and indicating means connected with said anemometer for indicating gas velocity thru said housing.

8. The meter of claim 7 including a resilient ring on the outer end of said housing adapted to adjust to the cylindrical contour of the wall of a well.

9. The meter of claim 7 including a reduction gear in the connector between said motor and said screw; and a slip clutch in said connector between said gear and said screw.

10. The meter of claim 7 including an elongated bumper arm extending longitudinally from the end of said body adjacent said anemometer and along the side of said body opposite said anemometer adapted to contact the wall of a well opposite said anemometer.

11. A flow meter for measuring the radial velocity of gas thru the wall of a well which comprises an elongated hollow probe body adapted to be lowered into a well with its axis longitudinally thereof; an anemometer within a housing completely outside of said body having an axial passageway for gas perpendicular to the axis of said body, said housing being open at both ends to provide flow of fluid from the wall of said well into the open well; oscillatable support means for said anemometer in the form of a parallelogram extending generally longitudinally of said body from the lower end thereof to maintain said perpendicular relation; oscillating means slidable up and down within the lower end of said body; actuating means connecting said oscillating means with said oscillatable support means; and means for oscillating said oscillating means.

12. A process for plotting the permeability of a permeable stratum around a test well therein which comprises passing gas thru said stratum between at least one offset well and said test well; successively placing one end of an open-ended anemometer housing in sealed relation to selected small areas of the wall of said test well within said stratum so that normal unrestricted radial flow of said gas thru the wall of said test well is effected thru said anemometer in each instance; sensing the velocity of gas flow thru said housing as a measure of gas flow thru each selected area and permeability thereof; and plotting the flow rates thus obtained.

13. The process of claim 12 wherein flow rates at different levels at different points around the circumference of said well are measured and plotted.

14. The process of claim 12 wherein gas is passed from a ring of offset wells into said test well.

References Cited in the file of this patent
UNITED STATES PATENTS

| | | |
|---|---|---|
| 2,313,176 | Shelby | Mar. 9, 1943 |
| 2,429,577 | French | Oct. 21, 1947 |
| 2,607,222 | Lane | Aug. 19, 1952 |
| 2,612,776 | Klas | Oct. 7, 1952 |
| 2,649,711 | Dale | Aug. 25, 1953 |
| 2,786,351 | Wiley et al. | Mar. 26, 1957 |
| 2,791,905 | Cheney | May 14, 1957 |
| 2,880,613 | Wiley | Apr. 7, 1959 |